United States Patent
Wermelinger

[11] Patent Number: 5,087,308
[45] Date of Patent: Feb. 11, 1992

[54] METHOD OF CONNECTING PIPES OF PLASTICS MATERIAL OF A DOUBLE PIPE SYSTEM

[75] Inventor: Jörg Wermelinger, Schaffhausen, Switzerland

[73] Assignee: Georg Fischer AG, Schaffhausen, Switzerland

[21] Appl. No.: 549,361

[22] Filed: Jul. 6, 1990

[30] Foreign Application Priority Data

Jul. 7, 1989 [CH] Switzerland ............... 02538/89

[51] Int. Cl.⁵ ............... B65H 69/02; B29C 65/00; F16L 41/00
[52] U.S. Cl. ............... 156/158; 156/304.2; 156/304.3; 156/304.6; 156/273.9; 285/22; 285/133.1; 285/138; 219/535
[58] Field of Search ............... 285/21, 23, 25, 28, 285/133.1, 138, 22, 284, 423; 219/535, 544; 156/158, 294, 304.2, 304.6, 304.3, 273.9

[56] References Cited

U.S. PATENT DOCUMENTS

| 3,344,491 | 10/1967 | Frederick | 285/138 |
| 4,479,602 | 10/1984 | Fernandez et al. | 285/138 X |
| 4,695,335 | 9/1987 | Lyall | 156/304.2 |
| 4,696,496 | 9/1987 | de Guelis et al. | 285/133.1 X |
| 4,718,698 | 1/1988 | Hill | 285/21 |
| 4,726,869 | 2/1988 | Matsui et al. | 156/304.2 |
| 4,925,218 | 5/1990 | Kunz et al. | 285/93 |
| 4,927,642 | 5/1990 | Kunz | 156/158 |

FOREIGN PATENT DOCUMENTS 0573363  9/1977  U.S.S.R. ............... 156/304.2

*Primary Examiner*—David A. Simmons
*Assistant Examiner*—Chester T. Barry
*Attorney, Agent, or Firm*—Toren, McGeady & Associates

[57] ABSTRACT

A method of connecting pipes of plastics material of a double pipe system and a pipe connection made by the method. The inner pipes of the pipe system are connected to each other with a sleeve member by welding or gluing. Clamping jaws are used for holding and moving the inner pipes toward each other. The outer pipes are shorter than the inner pipes at least by the thickness of the two clamping jaws. For bridging the gap between the outer pipes, an expandable intermediate ring is inserted in the gap. An electric welding sleeve is used for connecting the outer pipes and the intermediate ring.

4 Claims, 2 Drawing Sheets

METHOD OF CONNECTING PIPES OF PLASTICS MATERIAL OF A DOUBLE PIPE SYSTEM

BACKGROUND OF THE INVENTION

1. Field of the Invention

The present invention relates to a method of connecting pipes of plastics material of a double pipe system, wherein the inner pipes are rigidly connected by means of a sleeve connection and the outer pipes are rigidly connected by means of a welding sleeve.

The present invention also relates to a pipe connection for a double pipe system manufactured in accordance with the above-described method.

2. Description of the Related Art

In known double pipe systems, the outer and the inner pipes are held concentrically relative to each other by means of spacer members.

This makes it possible to manufacture a sleeve connection of the inner pipes by concentrically clamping the pipe systems at the outer diameter of the outer pipes.

In double pipe systems without relative centering of the inner and the outer pipe, it is not possible to manufacture a pipe connection using the above-described type of method.

SUMMARY OF THE INVENTION

It is, therefore, the object of the present invention to provide a method of the above-described type and a pipe connection manufactured by means of the method, wherein the inner and outer pipes can be connected rigidly without concentrically holding the pipes by means of spacer members.

In accordance with the present invention, the ends of the inner pipes to be connected are concentrically held relative to each other by means of clamping jaws and the ends of the inner pipes are axially moved together with the clamping jaws until the inner pipes are rigidly connected. The outer pipes are spaced apart at the point of connection by a distance which corresponds at least to the thickness of the clamping jaws. After the inner pipes have been connected, an expandable intermediate ring which is provided with a radial slot is pushed over the inner pipe and is radially inserted between the ends of the outer pipes. The two ends of the outer pipe and the intermediate ring are rigidly connected by means of a welding sleeve.

In the connection of inner and outer pipes of plastics material of a double pipe system manufactured by the above-described method, the inner pipes are connected by means of a sleeve connection. An expandable intermediate ring which is provided with a radial slot is arranged between the ends of the outer pipes. An electric welding sleeve is arranged on the outer circumference of the ends of the outer pipes and of the intermediate rings.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 3a is a cross-sectional view of the intermediate ring shown in FIG. 2a.

DESCRIPTION OF THE PREFERRED EMBODIMENT

Figure 1:
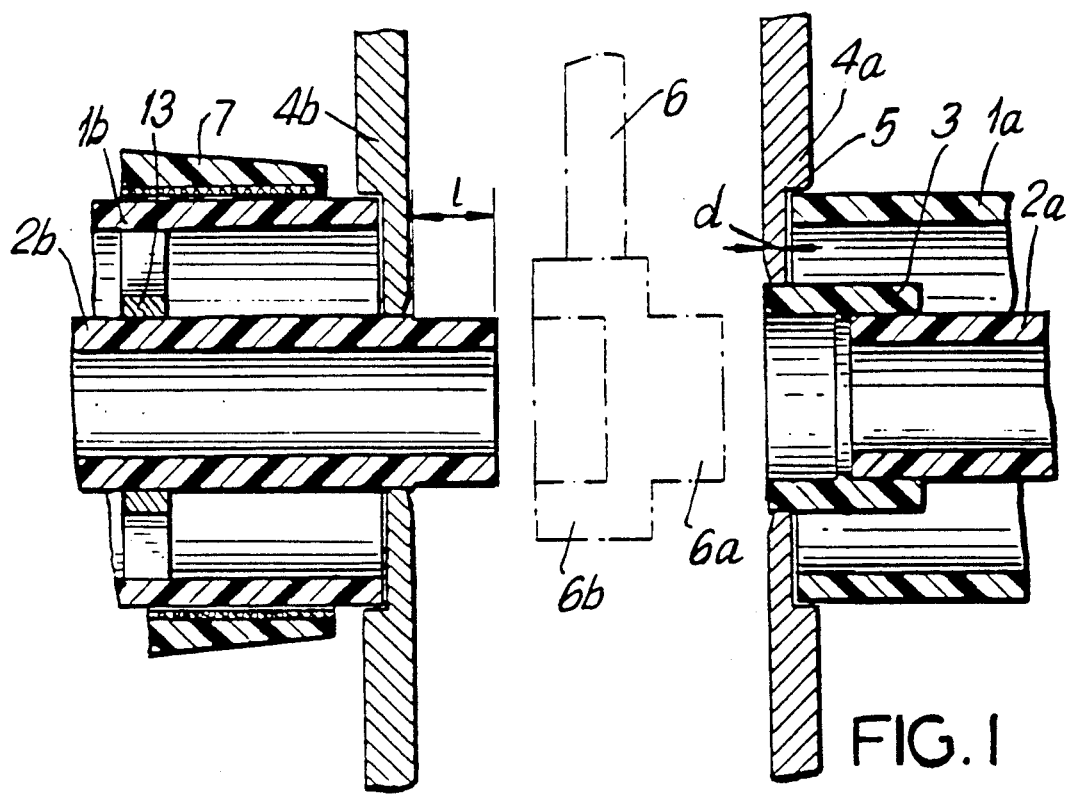
FIG. 1 is a sectional view of the ends of the outer and inner pipes of a double pipe system prior to being connected.

FIG. 1 of the drawing shows the ends of outer pipes 1a, 1b and of inner pipes 2a, 2b prior to the manufacture of sleeve connections. One of the inner pipe ends 2a is already rigidly connected to a sleeve 3. Spacers 13 are provided between the outer pipes 1a, 1b and the inner pipes 2a, 2b.

The connection of the inner pipes 2a, 2b is preferably effected by means of a welding device. Clamping jaws 4a, 4b are used for concentrically clamping the pipe 2a at the outer diameter of the sleeve 3 and the pipe 2b at its outer diameter outside of the length of insertion of the pipe 2b. The clamping jaws 4a, 4b have in the clamping area and up to the outer diameter of the outer pipes 1a, 1b a thickness d which is as small as possible, wherein the clamping jaws each have a centering step 5 for simultaneously concentrically fixing the outer pipes with play.

Subsequently, a heating device 6 with a heating projection 6a and a heating sleeve 6b is swung into the region between the ends of the inner pipes 2a, 2b. By displacing the clamping jaws 4a, 4b in the known manner, the inner diameter of the sleeve 3 and the outer diameter of the pipe 2b are then heated by means of the heating device 6. The heating device 6 is then swung out of the region of the clamping jaws 4a, 4b and the welding sleeve connection is obtained by moving the pipes 2a, 2b relative to each other by means of the displaceable clamping jaws 4a, 4b.

As can be seen in FIG. 1, the outer pipes 1a, 1b are shorter by at least the thickness d of the clamping jaws 4a, 4b seen from the ends of the inner pipes 2a, 2b to be connected.

The shorter length of the outer pipes 1a, 1b is necessary for concentrically holding the inner pipes when they are connected. The gap created between the outer pipes 1a, 1b of at least 2d makes possible a visual examination of the inner pipe connection with respect to tightness before the outer pipes are connected. The outer pipes 1a, 1b are then connected by means of an electric welding sleeve 7 which had previously been slid onto one of the outer pipes. Since the filament winding 8 can also generate heat in the middle portion of the welding sleeve 7, it is necessary to ensure that the two ends of the pipes 1a, 1b do not melt excessively and collapse inwardly. This is prevented by inserting an intermediate ring 9 into the gap between the ends of the outer pipes 1a, 1b.

Figure 3A:
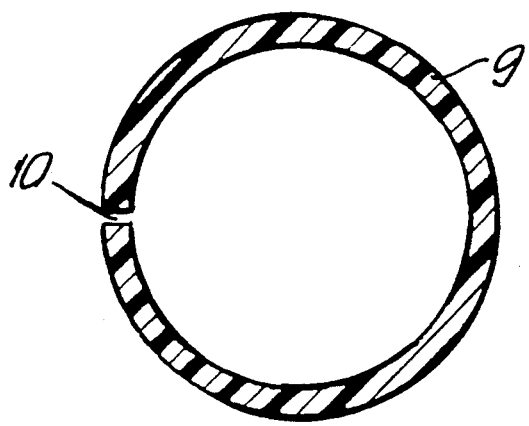
Figure 3B:
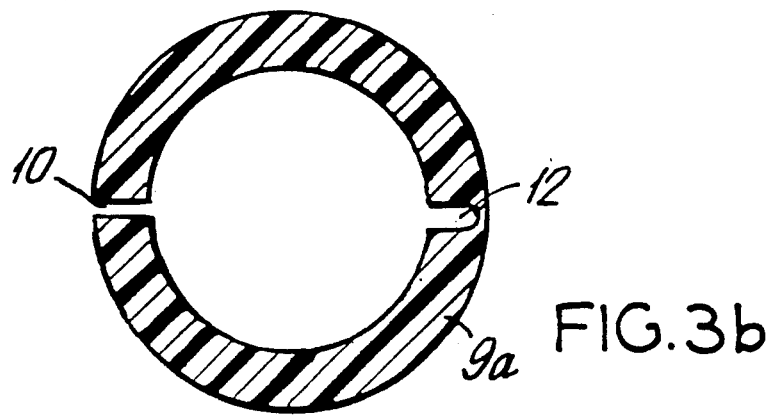
FIG. 3b is a cross-sectional view of the intermediate ring shown in FIG. 2b.
Figure 2A:
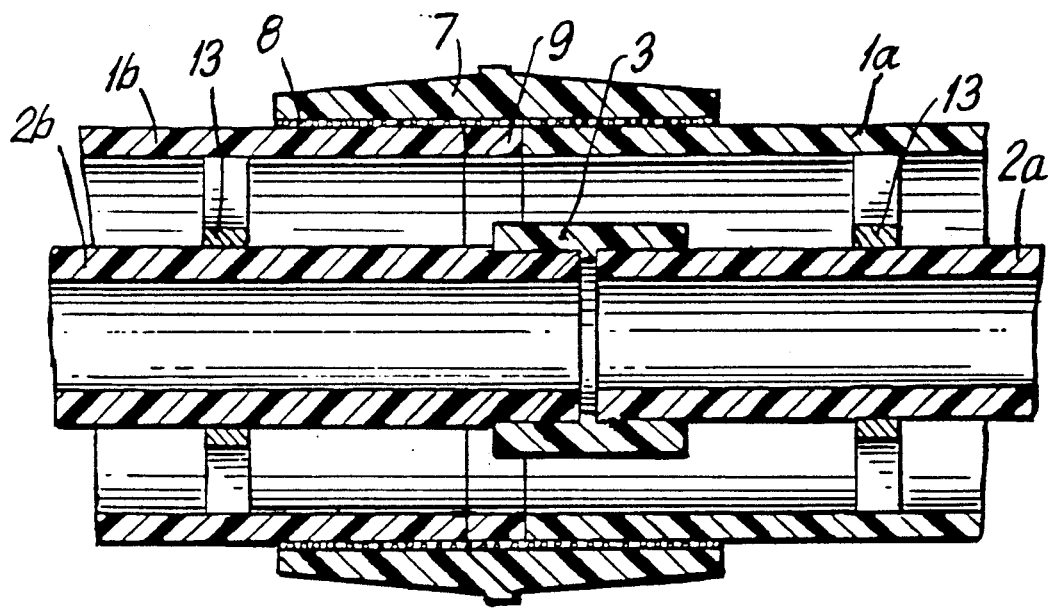
FIG. 2a is a sectional view of the sleeve connections of the inner and outer pipes of the double pipe system.

As can be seen in FIGS. 3a and 3b, the intermediate ring 9 has a radial slot 10. The intermediate ring 9 shown in FIG. 3a can be bent open to such an extent that it can be placed over the sleeve connection of the inner pipes 2a, 2b and can be placed between the pipes 1a, 1b to fill out the gap therebetween, as particularly illustrated of FIG. 2a.

The welded connection is subsequently effected in the known manner by means of the electric welding sleeve 7, so that the ends of the outer pipes 1a, 1b and the intermediate ring are connected rigidly and fluid media-tight to the electric welding sleeve 7.

Figure 2B:
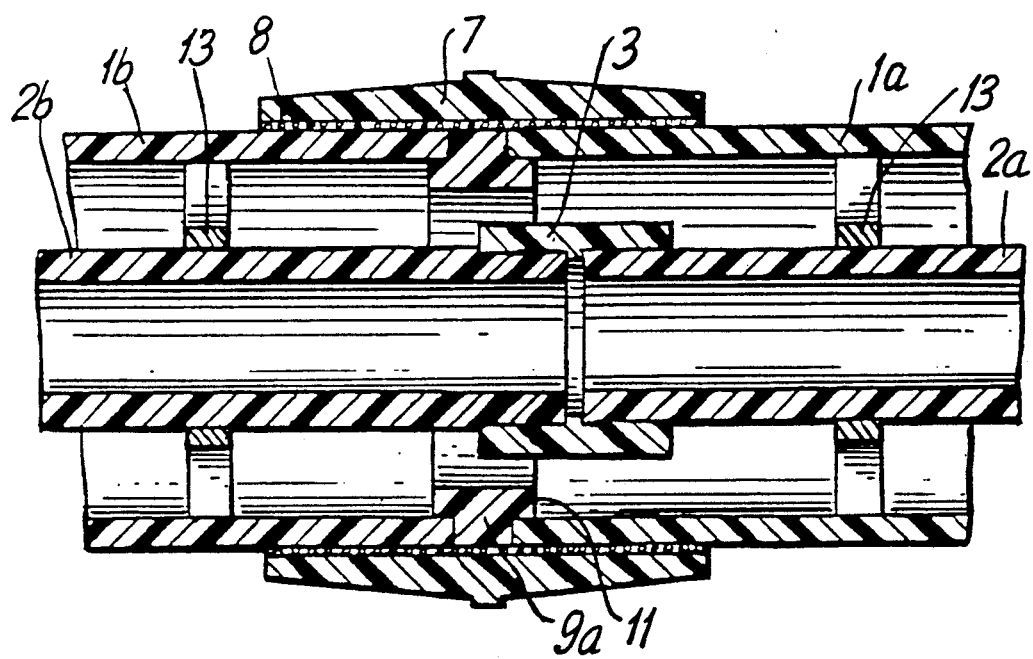
FIG. 2b is a sectional view of the sleeve connections of the inner and outer pipes of the double pipe system with a different intermediate ring between the outer pipes.

In the configuration of the intermediate ring 9a shown in FIG. 2b, the intermediate ring 9a has a greater wall thickness and a projection 11 at both sides. This safely ensures that the pipes 1a, 1b are prevented from collapsing towards the inside. The intermediate ring 9a is mounted by first slightly pulling the outer pipes apart from each other and then radially pushing the intermediate ring 9a over the inner pipes.

As FIG. 3b shows, the intermediate ring 9a has a greater wall thickness and can be provided with a film-type hinge 12, so that the intermediate ring can be more easily bent open. If desired, the intermediate ring 9a as shown in FIG. 3a may also be provided with a film-type hinge.

Instead of the welded sleeve connection of the inner pipes 2a, 2b, it is also possible to use a glued sleeve connection, wherein it is also in this case necessary to provide a concentric support by means of the clamping jaws 4a, 4b and the welding sleeve connection of the outer pipes 1a, 1b is constructed, as described above, by inserting the intermediate ring 9, 9a.

While a specific embodiment of the invention has been shown and described in detail to illustrate the application of the inventive principles, it will be understood that the invention may be embodied otherwise without departing from such principles.

I claim:

1. In a method of connecting pipes of plastics material of a double pipe system having inner and outer pipes, wherein the inner pipes are rigidly connected by means of a sleeve member and the outer pipes are rigidly connected by means of a welding sleeve, the improvement comprising holding the ends of the inner pipes to be connected concentrically relative to each other by means of clamping jaws and moving the ends of the inner pipes axially together with the clamping jaws until the inner pipes are rigidly connected by means of the sleeve member, spacing the outer pipes apart at the connection location by a distance which corresponds at least to the thickness of the clamping jaws, pushing an expandable intermediate ring which is provided with a radial slot over the inner pipes after the inner pipes have been connected and radially inserting the intermediate ring between the ends of the outer pipes, and rigidly connecting the two ends of the outer pipes and the intermediate ring to each other by means of the welding sleeve.

2. The method according to claim 1, comprising gluing the sleeve member to the inner pipes.

3. The method according to claim 1, comprising welding the sleeve member to the inner pipes.

4. The method according to claim 1, wherein the welding sleeves for connecting the outer pipes includes an electric filament winding.

* * * * *